(12) United States Patent
Baran et al.

(10) Patent No.: US 12,469,110 B2
(45) Date of Patent: Nov. 11, 2025

(54) SYSTEMS AND METHODS FOR APPLYING STYLE TRANSFER FUNCTIONS IN MULTI-CAMERA SYSTEMS AND MULTI-MICROPHONE SYSTEMS

(71) Applicant: Intel Corporation, Santa Clara, CA (US)

(72) Inventors: Stanley Baran, Chandler, AZ (US); Charu Srivastava, Danville, CA (US); Srikanth Potluri, Folsom, CA (US); Michael Rosenzweig, Queen Creek, AZ (US); Archie Sharma, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 817 days.

(21) Appl. No.: 17/554,437

(22) Filed: Dec. 17, 2021

(65) Prior Publication Data

US 2022/0108431 A1   Apr. 7, 2022

(51) Int. Cl.
| | |
|---|---|
| *H04N 5/232* | (2006.01) |
| *G06T 5/20* | (2006.01) |
| *G06T 5/50* | (2006.01) |
| *H04N 23/90* | (2023.01) |
| *H04R 1/40* | (2006.01) |
| *H04R 3/00* | (2006.01) |
| *H04R 3/04* | (2006.01) |

(52) U.S. Cl.
CPC ............... *G06T 5/50* (2013.01); *G06T 5/20* (2013.01); *H04N 23/90* (2023.01); *H04R 1/406* (2013.01);
(Continued)

(58) Field of Classification Search
CPC ... G06T 5/50; G06T 5/20; G06T 2207/10016; G06T 2207/20081; G06T 2207/20084;
(Continued)

(56) References Cited

U.S. PATENT DOCUMENTS

2018/0373999 A1* 12/2018 Xu .................... G06V 20/49
2019/0362478 A1* 11/2019 Nanda ................ G06T 7/90
(Continued)

FOREIGN PATENT DOCUMENTS

WO   2020248767   12/2020

OTHER PUBLICATIONS

Huang, H., et al., "Real-Time Neural Style Transfer for Videos", 2017 IEEE Conference on Computer Vision and Pattern Recognition (CVPR), Honolulu, HI, USA, 2017, 9 pages, retrieved from <https://openaccess.thecvf.com/content_cvpr_2017/papers/Huang_Real-Time_Neural_Style_CVPR_2017_paper.pdf>.
(Continued)

*Primary Examiner* — Alazar Tilahun
(74) *Attorney, Agent, or Firm* — Hanley, Flight & Zimmerman, LLC

(57) ABSTRACT

Systems and methods for applying style transfer functions in multi-camera systems and multi-microphone systems are disclosed herein. An example multi-camera style transfer system includes at least one memory, instructions in the system, and processor circuitry to execute the instructions to at least apply a style transfer function to a second image from a second video feed to generate a stylized image based on a reference image. The reference image corresponds to a first image from a first video feed. The first video feed is from a first camera. The second video feed is from a second camera. The processor circuitry also executed the instructions to adjust one or more parameter settings of a video filter based on the stylized image, and filter the second video feed using the video filter with the adjusted parameter settings to generate a filtered version of the second video feed.

20 Claims, 10 Drawing Sheets

(52) U.S. Cl.
CPC ............... *H04R 3/005* (2013.01); *H04R 3/04* (2013.01); *G06T 2207/10016* (2013.01); *G06T 2207/20081* (2013.01); *G06T 2207/20084* (2013.01)

(58) Field of Classification Search
CPC ........... G06T 11/00; G06T 5/00; H04N 23/90; H04N 7/147; H04N 21/21805; H04N 21/2187; H04N 21/2335; H04N 21/23418; H04N 21/2343; H04N 21/42203; H04N 21/4223; H04N 21/4788; H04R 1/406; H04R 3/005; H04R 3/04; H04R 29/004; G06N 3/0464; G06N 3/063; G06N 3/0455; G06N 3/08; H04S 7/30
See application file for complete search history.

(56) References Cited

U.S. PATENT DOCUMENTS

| | | | |
|---|---|---|---|
| 2021/0012181 A1 | 1/2021 | Zhu et al. | |
| 2021/0150310 A1* | 5/2021 | Wu | ..................... G06T 11/60 |

OTHER PUBLICATIONS

Gao, C., et al., "ReCoNet: Real-time Coherent Video Style Transfer Network", Computer Vision—ACCV 2018, 16 pages, retrieved from <https://arxiv.org/pdf/1807.01197.pdf>.

Jonghwa, Y., et al., "Filter style transfer between photos." Computer Vision-ECCV 2020: 16th European Conference, Glasgow, UK, Aug. 23-28, 2020, 17 pages, retrieved from <https://www.ecva.net/papers/eccv_2020/papers_ECCV/papers/123510103.pdf>.

European Patent Office, "European Search Report", issued in connection with European Application No. 22201684, filed Mar. 1, 2023, 11 pages.

Grinstein, E., et al., "Audio style transfer", CASSP 2018—2018 IEEE International Conference on Acoustics, Speech and Signal Processing (ICASSP), Nov. 7, 2018, 5 pages.

Gupta, A., et al., "Characterizing and Improving Stability in Neural Style Transfer", arXiv:1705.02092v1, May 5, 2017, 10 pages.

Huang, X., et al., "Arbitrary Style Transfer in Real-time with Adaptive Instance Normalization", arXiv:1703.06868, Jul. 30, 2017, 11 pages.

Luan, F., et al., "Deep Photo Style Transfer", arXiv:1703.07511, Apr. 8, 2017, 9 pages.

Xia, X., et al., "Real-time Localized Photorealistic Video Style Transfer", arXiv:2010.10056, Oct. 20, 2020, 16 pages.

* cited by examiner

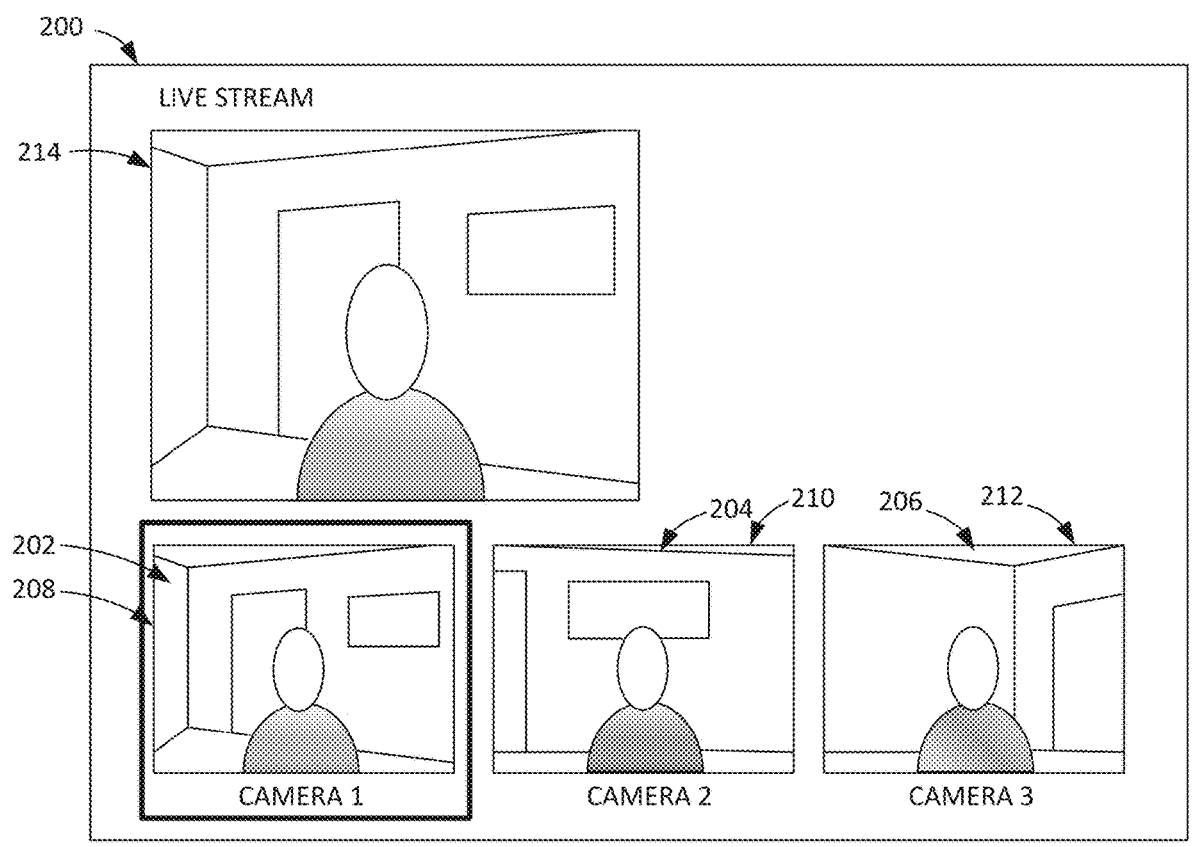
FIG. 2
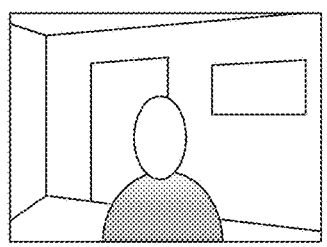 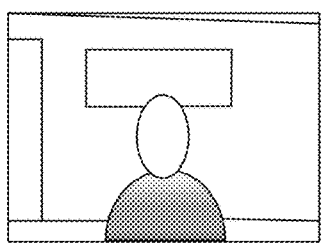 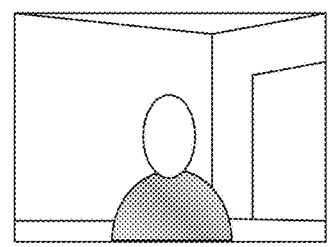
FIG. 3A      FIG. 3B      FIG. 3C

SYSTEMS AND METHODS FOR APPLYING STYLE TRANSFER FUNCTIONS IN MULTI-CAMERA SYSTEMS AND MULTI-MICROPHONE SYSTEMS

FIELD OF THE DISCLOSURE

This disclosure relates generally to multi-sensor systems and, more particularly, to systems and methods for applying style transfer functions in multi-camera systems and multi-microphone systems.

BACKGROUND

Multi-sensor systems are used in many environments today. For example, live streamers often utilize multiple cameras and/or multiple microphones. The live streamer can switch between certain ones of the cameras and/or microphones during the streaming session to broadcast to their audience. Multi-camera and/or multi-microphone systems are also used in other scenarios such as videoconferencing, sports game broadcasting, etc.

BRIEF DESCRIPTION OF THE DRAWINGS

FIG. 2 shows an example user interface that can be displayed on an example display of the example electronic device of FIG. 1.

FIGS. 3A, 3B, and 3C show example images from different cameras of the example multi-camera system of FIG. 1.

In general, the same reference numbers will be used throughout the drawing(s) and accompanying written description to refer to the same or like parts. The figures are not to scale.

Figure 1:
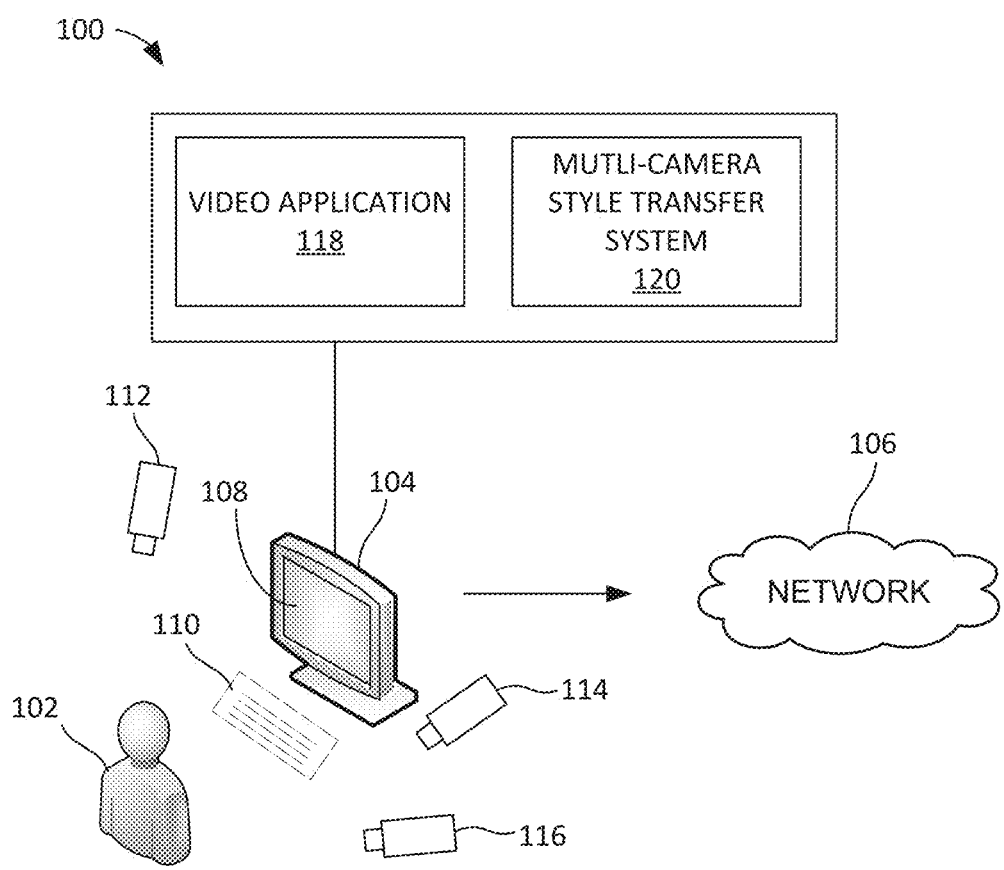
FIG. 1 illustrates an example multi-camera system including an example electronic device implementing an example multi-camera style transfer system constructed in accordance with the teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real-time" refers to occurrence in a near instantaneous manner recognizing there may be real world delays for computing time, transmission, etc. Thus, unless otherwise specified, "substantially real-time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Multi-sensor systems are used in many environments today. For example, many live streamers on Twitch®, YouTube® Live, Facebook® Live, Instagram® Live, etc., use multiple cameras during a live streaming session. The cameras can be positioned or orientated to record the user or other objects in the environment from different angles. During the live streaming session, the user may switch between different cameras to broadcast to their audience, which creates an engaging and entertaining production. Similarly, live streamers often utilize multiple microphones, and the user may switch between different ones of the microphones during the live streaming session. Multi-camera and multi-microphone systems are also used for video-conferencing, sports game broadcasting, and many other applications.

Users, such as live streamers, often utilize multi-camera systems composed of various off-the-shelf cameras. Such systems can also include different brands of cameras and/or different types of cameras. However, different cameras can produce different visual characteristics, which are especially pronounced between cameras of different brands and types. For example, different cameras may produce images having different visual characteristics, such as color temperature, tone, exposure, white balance, hue, saturation, and brightness. When switching from the video feed of one camera to the video feed of another camera, the colors of the objects in the video feeds may appear slightly different, such as having different shades, brightness, tone, etc. Therefore, when switching cameras, the audience may see a distinct change in the appearance of the objects, which is noticeable and creates a jarring, distracting effect for the viewer. Similarly, microphones have different audio characteristics, such as gain, signal to noise ratio (SNR), noise floor, frequency response, sensitivity, and reverberation. When switching between microphones, the audience may hear a change in these audio characteristics, as if the sound is coming from a completely different environment. Users desire both the best audio and visual characteristics (such as color fidelity, resolution, dynamic range, etc.) and a consistent look and feel across the multiple sensors.

State of the art setups, such as large scale movie productions, professional sports game broadcasting, etc., have highly selective processes for choosing and calibrating cameras. When watching a sporting event, for example, the color of the field and the color of the players' uniforms usually remain relatively consistent when there is a switch from one camera to another camera. These large scale productions use expensive cameras and require extensive calibration. Other large scale productions utilize additional equipment such as colorimeters to accurately measure the actual output of devices and develop custom color profiles. Other matching can be done using post processing of recorded data, but this process is mostly manual and uses subjective feedback to fine-tune the outputs. Therefore, such prior mechanisms for calibrating different cameras and microphones are tedious, time-consuming, and subjectively based on post production techniques.

Smaller scale and individual content creators do not have the same level of audio and video matching capability as large scale productions among their multiple integrated and peripheral off-the-shelf sensors. These users desire to have good quality camera and microphone matching capabilities for use with less expensive, off-the-shelf cameras and microphones. Users also desire their systems to be flexible and easy to modify, such as by changing the style of and/or adding/removing devices.

Disclosed herein are example systems and methods that utilize style transfer functions to calibrate filters for video or audio, such that the video or audio stream from one sensor has the same or similar characteristics (visual or audio) as another sensor. The example systems and methods disclosed herein can be used to calibrate multiple sensors to match or substantially match a particular one of the sensors (e.g., a reference sensor). As such, the video or audio streams will have the same or similar characteristics (e.g., visual characteristics or audio characteristics). This enables users, such as live streamers, to produce high quality content that appears the same or similar when switching between various sensors.

An example multi-camera system disclosed herein includes a first camera, a second camera, and a multi-camera style transfer system. While this example is described in connection with two cameras, it is understood the example multi-camera system can include any number of cameras. The multi-camera style transfer system can be implemented on an electronic device such a computer. The first and second cameras generate video feeds or streams that are transmitted to the electronic device. A user, such as a live streamer, can view the video streams on the electronic device and switch between different ones of the video feeds to broadcast to their audience, such as during a live streaming session. One of the cameras, such as the first camera, can be selected as the reference camera. The example multi-camera style transfer system utilizes a style transfer function (e.g., a photorealistic style transfer function) to adjust one or more parameter settings of a video filter for the second video feed such that the filtered version of the second video feed has the same or similar (e.g., substantially the same) visual characteristics (e.g., hue, brightness, tone, etc.) as the reference video feed (from the first camera). In some examples, this calibration procedure occurs during an initialization phase, such as the first few seconds when the second camera is activated. After the parameter settings are adjusted, the video filter filters the second video feed with the adjusted parameters to produce a video stream that has the same or similar visual characteristics as the video stream from the refence camera. The example system can similarly calibrate additional cameras in the same manner with reference to the first camera (the reference camera). In essence, the example system normalizes one or more camera video feeds to a reference camera video feed. As such, when switching between the video feeds to broadcast, there is little or no differences in the visual characteristics.

In some examples, the style transfer function is a machine learning model, such as a Neural Network (NN) style transfer function. The NN style transfer function accurately transfers or applies a style of one image to another image. For example, the NN style transfer function detects certain visual characteristics (e.g., hue, brightness, tone, etc.) in one image and applies those visual characteristics to another image. As such, the NN style transfer function can be used to adjust or set certain visual characteristics in one video feed so those characteristics appear the same or similar to another video feed. However, in some instances, the NN style transfer function demands a relatively high computational load. Therefore, example systems and methods disclosed herein intelligently use the NN style transfer function during the initialization phase to tune or adjust a video filter, and then use the video filter thereafter to filter the second video stream. As such, the system advantageously reduces load on the system (as opposed to continuously using the NN style transfer function) while still achieving highly accurate style transfer results.

The example style transfer functions disclosed herein can be used in real-time (or substantially real-time) and avoid temporal artifacts. This enables live streamers and other users to utilize the example systems and methods in real-time (or substantially real-time) scenarios. In some examples, the multi-camera style transfer system periodically updates the reference image and re-adjusts the parameter settings of the video filter based on the updated reference image. For example, at a certain time interval (e.g., every 5 minutes) and/or when a scene change is detected in the reference video feed, the system may update the reference image and re-adjust the parameter settings of the other camera(s). This ensures the video feed(s) remain similar to the reference video feed over time.

In some examples disclosed herein, the example multi-camera style transfer system uses segmentation and object matching to localize processing from the reference image to corresponding regions in the other camera feeds. For instance, in some environments, the background of the reference image may be relatively dark, which would cause a dark style transfer to be applied to the other cameras feeds. Instead, the system can segment the reference image and/or detect certain objects in the reference image and only apply a style transfer to that segment or image. For example, the reference image may be an image of a live streamer in his/her bedroom. The system can detect the boundary or outline of the live streamer. The system can then apply the style reference techniques disclosed herein to transfer the style from the live streamer segment of the reference image to the corresponding live streamer in the other camera feeds. Therefore, the darker background colors in the reference image do not negatively affect the other camera feeds. In some examples, the system may detect multiple segments in the images and may apply style transfer functions for corresponding ones of the segments (e.g., one style transfer between the backgrounds of the images and another style transfer for an object in the image).

The example systems and method disclosed herein can also be used in connection with multi-microphone systems. For example, the systems and methods can be used to intelligently adjust one or more parameter settings of an audio filter such that one of the microphones has the same or similar audio characteristics as another microphone. As such, when switching between microphones, the audio streams have the same or similar (e.g., substantially the same) audio characteristics. Therefore, the example systems and methods disclosed herein normalize different cameras and microphones during production in a manner that is equivalent to studio production quality.

FIG. 1 illustrates an example multi-camera system 100 in which examples disclosed herein can be implemented. In the illustrated example, the multi-camera system 100 is used by a user or person 102. The person 102 can be a live streamer, such as live streamer on Twitch®, YouTube® Live, Facebook® Live, Instagram® Live, etc. In other examples, the person 102 can be on a video conference with one or more other persons. The example multi-camera system 100 includes an example electronic device 104. The person 102 uses the electronic device 104 to stream live video over a network 106, such as the internet, to one or more other persons. In this example, the electronic device 104 is implemented as desktop computer including an example display 108 and an example keyboard 110. However, in other examples, the electronic device 104 can be implemented by any other type of electronic device, such as a smartphone, a tablet, a laptop computer, a game console, etc.

In the illustrated example, the example multi-camera system 100 includes three cameras, including a first example camera 112, a second example camera 114, and a third example camera 116. The cameras 112-116 are positioned at different angles to record the person 102 and/or the surrounding environment (e.g., the person's desk, the room the person is sitting in, etc.). Each of the cameras 112-116 generates a respective video feed and transmits the video feed (in the form of a sequence of images or frames) to the electronic device 104. The person 102 may select one or multiple video feeds to broadcast to their audience. The cameras 112-116 can be physically connected (e.g., via one or more wires or cables) or wirelessly connected to the electronic device 104. In some examples, the cameras 112-116 are discrete devices that are separate from the electronic device 104. For example, one or more of the cameras 112-116 can be webcams that are connected (e.g., via a USB cable) to the electronic device 104. In other examples, one or more of the cameras 112-116 can be physically integrated into the electronic device 104 (e.g., such as a computer with a built-in camera). The cameras 112-116 can be implemented by any type of cameras, such as off-the-shelf cameras (e.g., webcams). The cameras 112-116 can be different types or brands of cameras. While in this example the multi-camera system 100 includes three cameras, in other examples, the multi-camera system 100 can include any number of cameras. For example, in some instances, the multi-camera system 100 includes only two cameras (e.g., the first and second cameras 112, 114). In other instances, the multi-camera system 100 incudes more than three cameras (e.g., four camera, five cameras, etc.).

In the illustrated example, the multi-camera system 100 includes an example video application 118 on the electronic device 104. The video application 118 provides a platform or interface to view the video feeds on the display 108. The video application 118 can also include various software tools for editing the video feeds.

In the illustrated example, the multi-camera system 100 includes an example multi-camera style transfer system 120. In this example, the multi-camera style transfer system 120 is implemented on the electronic device 104. For example, the multi-camera style transfer system 120 may be an application or software executed by processor circuitry of the electronic device 104. An example processor platform capable of implementing such instructions is disclosed in connection with FIG. 9. In some examples, the multi-camera style transfer system 120 is part of the video application 118. In some examples, the multi-camera style transfer system 120 is implemented by a separate application from the video application 118.

The multi-camera style transfer system 120 utilizes style transfer functions (e.g., photorealistic style transfer function) to adjust one or more parameters of the video feeds so that the video feeds have the same or similar visual characteristics, such as color filtering, tone mapping, hue, brightness, etc. As a result, when the person 102 switches between two of the video feeds to broadcast to the audience, the person 102 and/or their environment in the video feeds appear the same or similar. This provides a smooth, professional looking appearance as if using large scale production equipment that was professionally calibrated.

FIG. 2 shows an example interface 200 that can be generated by the video application 118 and/or the multi-camera style transfer system 120 on the example display 108 for viewing and/or editing the video feeds. The example interface 200 of the illustrated example corresponds to an example graphical user interface that shows the video feeds provided by the cameras 112-116 (FIG. 1). For example, the first camera 112 generates a first example video feed 202 that is received or otherwise accessed by the interface 200, the second camera 114 generates a second example video feed 204 that is received or otherwise accessed by the interface 200, and the third camera 116 generates a third example video feed 206 that is received or otherwise accessed by the interface 200. The interface 200 presents the video feeds 202-206 in separate example windows 208-212, as depicted in the illustrated example. This enables the person 102 to view the video feeds 202-206 simultaneously. The person 102 can select (e.g., via an input device such as a mouse) one of the video feeds 202-206 to live stream to the audience. In this example, the person 102 has selected the first video feed 202. In some examples, the video feed that is being streamed to the audience is displayed in a larger example window 214 in the interface 200. Additionally or alternatively, the video feed that is being streamed to the audience can be highlighted (e.g., using a colored bar around the smaller window). The person 102 can select a different one of the video feeds to switch to during the live streaming session. This enables the person 102 to provide an engaging live streaming event.

As noted above, different cameras produce different visual characteristics. Even the same type/brand of camera can produce different visual characteristics if the cameras are not accurately calibrated to each other. For examples, FIGS. 3A, 3B, and 3C show images from the first, second, and third cameras 112, 114, 116, respectively. While the cameras 112-116 are all recording the same scene of the person 102 (but from different angles), the colors in the images can look slightly different. For example, the shade of the color of person's shirt is slightly different in each of the images of FIGS. 3A, 3B, and 3C. This is because different cameras have different visual characteristics or parameters, such as brightness, hue, white balance, etc. Even having different cameras in the exact same position and oriented at the same scene can produce different characteristics. When switching between the video feeds 202-206, this shift in visual characteristics can have a negative appearance that is distracting and unappealing to the audience. The example multi-camera style transfer system 120 disclosed herein can reduce or eliminate this effect, such that the video feeds 202-206 from the different cameras 112-116 appear the same or similar.

Figure 4:
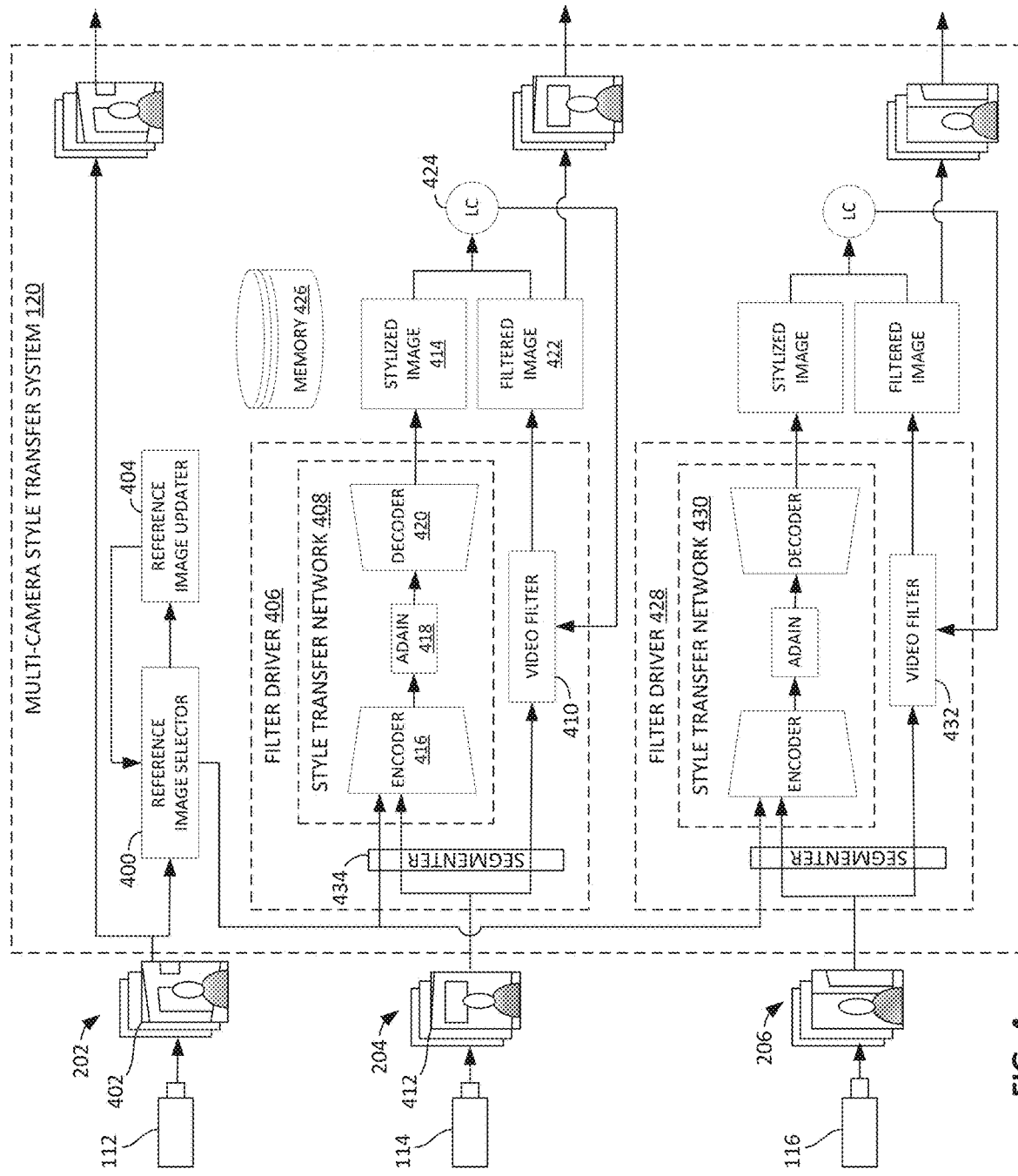
FIG. 4 is a block diagram of the example multi-camera style transfer system of FIG. 1.

FIG. 4 is a block diagram of the example multi-camera style transfer system 120, referred to herein as the system 120. The system 120 receives the video feeds 202-206 from the respective cameras 112-116. The video feeds are sequences of images (sometimes referred to as frames). One of the camera inputs can be chosen as the reference for all of the cameras. In other words, one of the cameras 112-116 can be selected as the desired or reference camera for the "look-feel" to be applied to the other cameras. In this example, the first camera 112 is selected as the reference camera. However, in other examples, the second camera 114 or the third camera 116 can be selected as the reference camera.

In the illustrated example, the system 120 includes a reference image selector 400. The reference image selector 400 selects or identifies one of the images from the first video feed 202 (the reference camera feed) as a reference image. The reference image is used to adjust filter settings for the other second and third cameras 114, 116, as disclosed in further detail herein. In this example, the reference image selector 400 selects a first image 402 from the first video feed 202 as the reference image. In some examples, the first image 402 is the first image obtained by the first camera 112 when the first camera 112 is activated. However, in other examples, the reference image selector 400 can select any image from the first video feed 202. In the illustrated example, the system 120 includes a reference image updater 404. The reference image updater 404 determines whether to update the reference image. For example, the reference image updater 404 can check one or more parameters and instruct the reference image selector 400 to update the reference image based on those parameter(s), as disclosed in further detail herein.

To transfer the style of the first video feed 202 (the reference video feed) to the second video feed 204, the system 120 includes a filter driver 406 for the second video feed 204. The filter driver 406 receives the second video feed 204. The filter driver 406 applies a style transfer function to the second video feed 204 so that the second video feed 204 has the same or similar visual characteristics as the first video feed 202. In the illustrated example, the filter driver 406 includes a style transfer network 408 and a video filter 410. The video filter 410 filters the second video feed 204 (i.e., the images of the second video feed 204) based on one or more parameter settings. The parameter settings of the video filter 410 can correspond to camera image/sensor settings that effect certain visual characteristics such as exposure, white balance, etc. The parameter settings can also include a color filter that adjusts effects such as hue, saturation, brightness, etc. The parameter settings can further include a tone-mapping operation, such as with Intel® Media Video Enhancement (VEBOX) Engine provided by Intel Corporation. Therefore, the parameter settings can correspond to one or more visual characteristics including at least one of color temperature, tone, exposure, white balance, hue, saturation, or brightness. The parameter settings can be adjusted to affect the corresponding visual characteristics (e.g., increase or decrease brightness). For example, the levels or values of these parameter settings can be changed to affect the color temperature, tone, exposure, white balance, hue saturation, brightness, etc. The video filter 410 can adjust one or multiple ones of the parameter settings to create different effects. While many of the examples disclosed herein are described in connection with utilizing multiple parameter "settings," it is understood that any of the examples disclosed herein can also refer to utilizing only one parameter setting.

During an initialization or adjustment phase, the style transfer network 408 is used to adjust the parameter settings of the video filter 410 such that the filtered version of the second video feed 204 has the same or similar visual characteristics as the first video feed. In some examples, the initialization phase of the video filter 410 occurs when the second camera 112 is first activated and/or when the system 120 is first started. After the initialization phase, the video filter 410 can be used thereafter to filter the second video feed 204.

During the initialization phase, the style transfer network 408 receives the reference image selected by the reference image selector 400, which, in this example, is the first image 402. The filter driver 406 selects an image 412, referred to as the second image 412, from the second video feed 204. In some examples, the filter driver 406 selects the most recent image from the second video feed 204 when the initialization phase is started and/or when the second camera 114 is first activated. The style transfer network 408 applies a style transfer function to the second image 412, based on the reference image (the first image 402), to generate a stylized image 414. The stylized image 414 is a stylized version of the second image 412. In some examples, the style transfer function identifies visual characteristics of the reference image (the first image 402) and applies/transfers the visual characteristics to the second image 412 to generate the stylized image 414. In other words, the style transfer function applies the style of the first image 402 to the second image 412 to generate the stylized image 414. As an example of the process performed by the style transfer function, the style image (the first image 402) is passed through the network and its style representation at multiple layers is computed and stored. The content image (the second image 412) is passed through the network and the content representation in one layer is stored. Then, a random white noise image is passed through the network and its style features and content features are computed. On each layer included in the style representation, the element-wise mean squared difference between style and content image are computed to give the style loss. Also, the mean squared difference is computed to give content loss. The total loss is then a combination between the content and the style loss. This process is used to iteratively update the content image (the second image 412) until it simultaneously matches the style features of the style image (the first image 402) and the content features of the content image.

In the illustrated example, the style transfer network 408 includes an example encoder 416, an example adaptive instance normalizer 418, and an example decoder 420. The encoder 416 encodes features from the source and reference video frames, the adaptive instance normalizer 418 normalizes mean and variance of source and reference feature map, and the decoder 420 generates the mapping between intermediate feature maps and output image. In other examples, other types of style transfer networks can be implemented.

In some examples, the style transfer function is a photorealistic style transfer function. Unlike other style transfer functions, photorealistic style transfer functions prevent spatial distortion by constraining the transfer operation to happen only in color space, whereas the boundary and structural lines in the image are maintained. This ensures the stylized image is still photorealistic as opposed to distorted or warped as seen in more artistic style transfer functions. As such, the stylized image 414 is a photorealistic version of the second image 412 with the style or visual characteristics of the reference image (the first image 402). In some examples, the photorealistic style transfer function is a machine learning model, such as a Neural Network (NN) style transfer function or a Convolutional Neural Network (CNN) style transfer function. An example CNN includes Adaptive Instance Normalizations for Real Time Photo Realistic Style Transfer. Examples of style transfer functions that can be implemented are disclosed in: Luan, F., Paris, S., Shechtum, E., & Bala, K. (2017). Deep Photo Style Transfer. arXiv: 1703.0751; Huang, X., & Belongie, S. (2017). Arbitrary Style Transfer in Real-time with Adaptive Instance Normalization. arXiv:1703.06868; Gupta, A., Johnson, J., Alahi, A., & Fei-Fei, L. (2017). Characterizing and Improving Stability in Neural Style Transfer. arXiv:1705.02092v; and_ Xia, X., Xue, T., Lai, W.-s., Sun, Z., Chang, A., Kulis, B., & Chen, J. (2020). Real-time Localized Photorealistic Video Style Transfer. arXiv:2010.10056.

During the initialization phase, the video filter 410 receives the selected second image 412 and filters the second image 412 to generate a filtered image 422. The filtered image 422 is a filtered version of the second image 412 using the current parameter settings of the video filter 410. In the illustrated example, the system 120 includes a loss function comparator 424. The loss function comparator 424 receives the stylized image 414 and the filtered image 422, and applies a loss function based on the stylized image 414 and the filtered image 422. The loss function comparator 424 uses the loss function to compare the stylized image 414 and the filtered image 422, and adjusts one or more of the parameter settings of the video filter 410 based on the difference(s) between the stylized image 414 and the filtered image 422 (e.g., as quantified by the loss function). As such, the loss function comparator 424 feeds back to the video filter 410 to dynamically adjust one or more of the parameter settings of the video filter 410 to reduce (e.g., minimize) the output of the loss function. In some examples, this cycle occurs multiple times. For example, the video filter 410 can apply the adjusted parameter settings to the second image 412 to create another filtered image 422, and the loss function comparator 424 again compares the stylized image 414 and the filtered image 422 and adjusts the parameter settings of the video filter 410. At first, the stylized image 414 and the filtered image 422 may appear quite different. After one or more cycles, the filtered image 422 converges to the stylized image 414 (e.g., appears the same or substantially the same). As an example, the filter driver 406 filters the second image 412 of the video filter 410 using first parameter settings to generate the filtered image, 422, and then the loss function comparator 424 applies the loss function to determine a difference between the stylized image 414 and the filtered image 422 and change the first parameter settings to second parameter settings based on a difference between the stylized image 414 and the filtered image 422. The loss function comparator 424 can use any loss function such as gradient descent, raised descent, etc. After the filtered image 422 and the stylized image 414 converge or substantially converge, the video filter 410 saves the adjusted parameters settings. The adjusted parameter settings can be saved in a memory 426. These adjusted parameters settings represent the settings that produce a style that matches the style of the first camera 112. Once the parameter settings are determined, the initialization phase if over, and the video filter 410 filters the second video feed 204 using the adjusted parameter settings determined during the initialization phase.

Therefore, the example filter driver 406 uses a style transfer function (e.g., a machine learning model) to intelligently determine how to configure the video filter 410 to create a style that matches the style from the first camera 112, and then uses those adjusted parameter settings to generate a filtered version of the second video feed 204 thereafter. As a result, the second video feed 204 has the same or similar style or visual characteristics as the first video feed 202. Thus, when the person 102 switches between the first and second video feeds 202, 204, the colors and other parameters in the video feeds are the same or similar, as if using professionally calibrated camera systems were used. This enables users to create professional quality live streaming sessions even while using less expensive, uncalibrated, off-the-shelf cameras.

As disclosed above, the style transfer network 408 applies a style transfer function to generate the stylized image 414. In some examples, the style transfer function is a machine learning model. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a Neural Network (NN) such as a Convolutional Neural Network (CNN) model is used. In some examples, CNN models are advantageous for images and videos compared to other types of machine learning models. However, other types of machine learning models (e.g., gaussian process, latent variable models, variational auto-encoders)

could additionally or alternatively be used. In some examples, image and video filters could be used for adjusting color, contrast, noise brightness, color temperature, tone, exposure, white balance, hue, saturation, etc. In some examples, audio filters could be used for adjusting noise, frequency response, equalization settings (bass, treble, and mid or multi-band), noise floor, reverberation and room effects, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In some examples, the model is trained offline before the model is employed. In other examples the model may be trained and/or re-trained by the system 120 during execution. In some examples, the model is trained using training data from specific style transfer environments, such as images from webcams from live streamers. In some such examples, the model is specifically trained for live streaming type applications and can produce better style transfer results. In other examples, the model can be a broader or more generic style transfer network model that is trained with images from numerous applications. In other words, these types of models are trained on different styles for arbitrary style inputs.

Once training is complete, the model is deployed for use as an executable construct that processes an input and provides an output based on the network of nodes and connections defined in the model. The model is stored at the memory 426. The model may then be executed by the style transfer network 408.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model (e.g., the stylized image 414) can be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

As disclosed above, the stylized image 414 generated by the style transfer function is the desired version of the second image 412 having the same or similar visual characteristics as the reference image (the first image 402). Therefore, in some examples, instead of using the video filter 410, the style transfer network 408 can apply the style transfer function to all of the images of the second video feed 204 to create the stylized video feed. However, in some examples, the style transfer function (e.g., the machine learning model) requires a relatively large computational load to generate a stylized image. Therefore, while it may be possible to apply the style transfer function to every image in the second video feed 204, it can be more efficient to use the stylized image 414 to adjust the parameter settings of the video filter 410, and then use the video filter 410 thereafter.

In some examples, the initialization phase occurs when the second camera 114 is first activated. For example, when the person 102 first turns on the second camera 114 or launches the video application 118 to view/broadcast the second video feed 204, the system 120 performs the initialization phase to adjust the parameter settings of the video filter 410. The initialization phase may occur relatively quickly, such as within a fraction of a second. In some examples, the system 120 prevents the output for the second video feed 204 until the initialization is over. In other words, the system 120 may delay displaying or broadcasting the second video feed 204. That way, the person 102 and/or their audience do not see a change in the visual characteristics of the second video feed 204 while the calibration occurs.

In some examples, the system 120 can re-initialize or re-calibrate the video filter 410 after a period of time or after a certain event occurs. This ensures the second video feed 204 remains consistent with the first video feed 202. In some examples, the reference image updater 404 determines whether to update the reference image. In some examples, the reference image updater 404 determines whether to update the referenced based on a comparison of a parameter to a threshold. The parameter can be at least one of a time limit, a drastic change in the first video feed 202 relative to the reference image, or a change of scene in the first video feed 202 or the second video feed 204. For example, in some instances, the reference image updater 404 determines to update the reference image according to a certain time limit, such as every 10 minutes. When it is time to update the reference image, the reference image updater 404 instructs the reference image selector 400 to select a new image from the first video feed 202. The new image may be the most recent image in the first video feed 202. After a new reference image is selected, the filter driver 406 repeats the initialization phase to update the parameter settings of the video filter 410. In another example, the reference image updater 404 monitors the first video feed 202 and compares the images to the reference image to identify if a drastic change has occurred. In some examples, the reference image updater 404 uses a loss function (which may be the same or different type of loss function that implemented by the loss function comparator 424). If a drastic change has occurred, the reference image updater 404 instructs the reference image selector 400 to select a new reference image, and the initialization phase is repeated. As another example, the reference image updater 404 monitors for scene changes in the first video feed 202 and/or the second video feed 204. For example, if the person 102 moves the first camera 112 to point at a different location in the room, turns on the lights, etc., the reference image updater 404 instructs the reference image selector 400 to select a new reference image. This ensures the first and second video feeds 202, 204 maintain the same or similar visual characteristics over time.

In some examples, re-initialize occurs when a new reference camera is selected. Additionally or alternatively, the user may determine when to re-initialize. Therefore, in some examples, the system 120 re-initializes the video filter 410 in response to user input (e.g., on the interface 200).

In the illustrated example, the system 120 includes a filter driver 428 for the third video feed 206. The filter driver 428 operates the same as the filter driver 406 disclosed in connection with the second video feed 204. In particular, the filter driver 428 includes a style transfer network 430 and a video filter 432 that filters the third video feed 206. The style transfer network 430 is used to adjust one or more parameter settings of the video filter 312 so that the third video feed 206 has the same or similar visual characteristics as the first video feed 202. To avoid redundancy, a description of the filter driver 428 is not provided. Instead, it is understood that any of the example aspects disclosed in connection with the filter driver 406 associated with the second video feed 204 can likewise apply to the filter driver 428 associated with the third video feed 206. The example system 120 can include filter drivers for any additional cameras that may be added to the system 120.

The first video feed 202 and the filtered versions of the second and third video feeds 204, 206 can be output to the video application 118. The video feeds 202-206 can be displayed on the display 108 (e.g., via the interface 200) and/or broadcast to one or more viewers.

In this example, the first camera 112 is used as the reference camera. However, in other examples, the second camera 114 or the third camera 116 can be the reference camera. In such an example, the system 120 includes a filter driver for the first video feed 202. In some examples, the system 120 can switch which camera is the reference camera during the live streaming session. In some examples, the switching is based on user input. For example, the person 102 can select (e.g., via input to the interface 200) a desired camera to be the reference camera for the other cameras. The person 102 can change the reference camera during the live streaming session. Therefore, the reference image selector 400 can select or identify the reference video based on user input applied to the interface 200.

In other examples, instead of using one of the cameras 112-116 as the reference camera for the other cameras, a style from an outside source can be applied to all of the cameras. For example, an image having a desired style can be input to the system. The image can be from a camera that produces desired visual characteristics. The image can be used as a reference image to adjust the video filters of all of the cameras 112-116. In some examples, the person 102 may select the desired reference image. This enables users to create high quality video content.

In some instances, certain segments or portions of the reference image can heavily influence the visual characteristic of the other camera feeds. For example, the reference image may have a relatively dark background. If the style from the entire reference image was applied to the second video feed, it may negatively affect the visual characteristics of the second video feed (e.g., by making the entire video feed darker). Therefore, in some examples, the system 120 includes a segmenter 434. The segmenter 434 enables the system 120 to apply certain style transfer functions to specific regions or segments in the images/video feed while ignoring or negating other regions or segments.

Figure 5A:
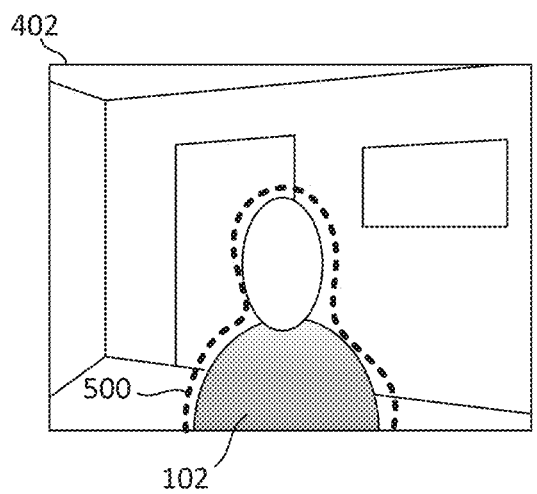
FIGS. 5A and 5B show an example segmentation process that can be implemented by the example multi-camera system transfer system of FIG. 1.

For example, referring to FIG. 5A, the segmenter 434 identifies a first segment 500 in the reference image (the first image 402). The first segment 500 may be a portion or section of the reference image. In some examples, the first segment 500 is an object in the reference image, such as the person 102. In some examples, the segmenter 434 identifies the first segment 500 based on input from a user. For example, the person 102 may highlight or draw a boundary (e.g., using an input device such as a mouse) on a segment on the reference image on the display 108. Additionally or alternatively, the segmenter 434 can apply a machining learning model to identify certain segments in the reference image, such as segments in the reference image containing people.

Figure 5B:
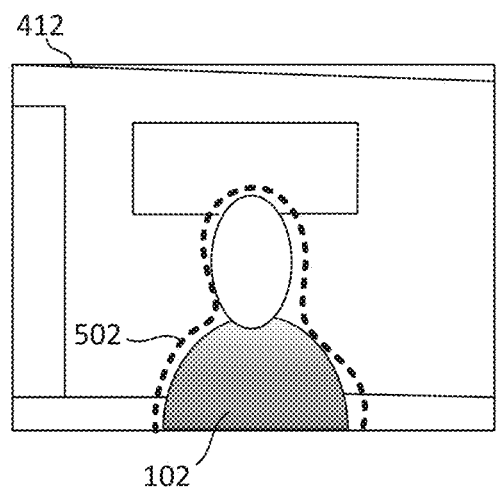

Referring to FIG. 5B, the segmenter 434 identifies a second segment 502 in the second image 412 corresponding to the first segment 500. For example, if the first segment 500 in the reference image is the person 102 in the reference image, the segmenter 434 identifies the boundaries of the person 102 in the second image 412. In some examples, the segmenter 434 applies a machine learning model to identify the second segment 502 in the second image 412 that corresponds to the first segment 500 in the reference image. For example, the segmenter 434 can use a Neural Network based sematic segmentation algorithm, such as MobileNetV3. In some examples, the segmenter 434 matches regions between the two images based on segmentation class identifiers.

Then, during the initialization phase, the style transfer process is restricted to the second segment 502, and the visual characteristics of the first segment 500 are used to affect the second segment 502 of the second video feed. For example, the video filter 410 may be restricted to use one or more parameter settings of the video filter 410 to affect the corresponding second segment 502 in the second video feed 204, and may leave other portions of the second video feed 204 unchanged. This reduces or prevents the remaining portions of the reference image from influencing the style of the second image 412. In some examples, the segmenter 434 applies color transfer and histogram matching for the pair of matched segments 500, 502 using standard image processing techniques. The segmenter 434 may continuously identify or detect the corresponding segment it the second video feed 204 so that the video filter 410 can filter only the corresponding segments with the parameter settings. Therefore, in some examples, the segmenter 434 implements means for identifying or segmenting a first segment in a reference image and a second segment in a second image.

In some examples, multiple segments can be identified and matched between the images. For example, in some instances, semantic segmentation has a finite set of classes that can be modified based on use case to cover segment classes relevant to the scene every use case targets. However, there may still be unclassified segments (identified as background by default). These can be left as is with the original capture conditions. Alternatively, these background segments can be matched with the closest neighboring identified segment. As another example, the background segment in the reference image can be used as a style for the background segment of the second image 412. Therefore, one style can be applied between the person 102 in the two images, and another style can be applied between the backgrounds in the two images. Styles can also be switched between the reference image and the other images. For example, a style from a segment from the second image 412 can be used as a style for a corresponding segment in the first image 402 to affect the first video feed. As an example, the person 102 may prefer the visual characteristics of an object in the first video feed 202, but may prefer the background visual characteristics from the second video feed 204.

Figure 6:
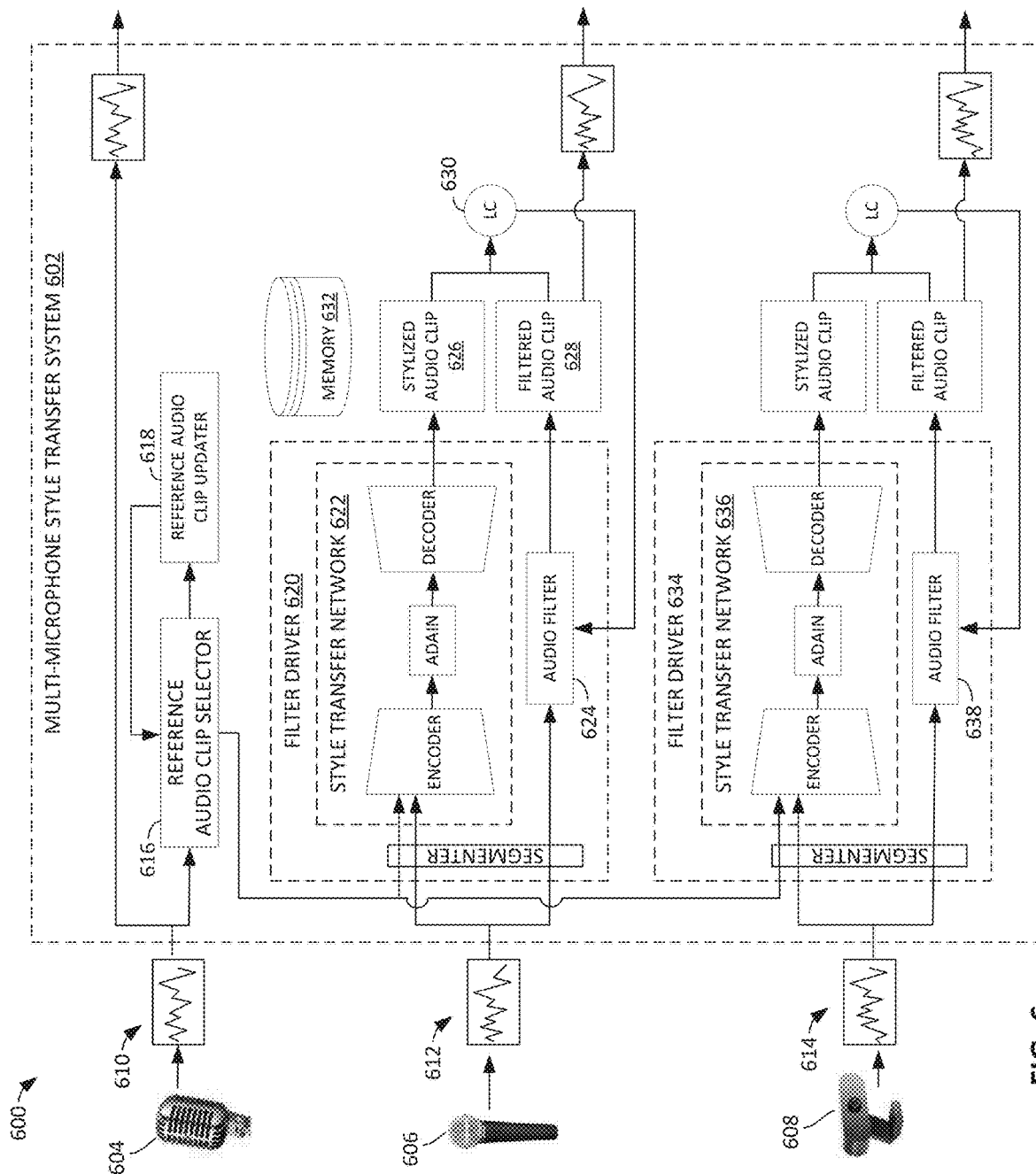
FIG. 6 is a block diagram of an example multi-microphone system including an example multi-microphone style transfer system constructed in accordance with the teachings of this disclosure.

The example systems and method disclosed herein can also be implemented in connection with other types of multi-sensor systems, such as a multi-microphone system. For example, FIG. 6 is a block diagram of an example multi-microphone system 600 including an example multi-microphone style transfer system 602, referred to herein as the system 602. The example multi-microphone system 600 can be used by the person 102 of FIG. 1 in addition to or as an alternative to the multi-camera system 100. In the illustrated example, the multi-microphone system 600 includes a first microphone 604, a second microphone 606, and a third microphone 608. The first microphone 604 generates a first audio stream 610, the second microphone 606 generates a second audio stream 612, and the third microphone 608 generates a third audio stream 614. In other examples, the multi-microphone system 600 can include more or fewer microphones. The system 602 can be implemented on the electronic device 104. The microphones 604-608 can be physically connected or wirelessly connected to the electronic device 104. The person 102 (FIG. 1) can select which of the microphones to use to collect audio that is broadcast to their audience.

The example system 602 is substantially the same as the system 120 disclosed above in connection with the cameras. Therefore, to avoid redundancy, a description of many of the example components and aspects is not repeated. Instead, it is understood that any of the example components and/or aspects disclosed in connection with the system 120 for use with cameras can likewise apply to the system 602 for use with microphones. A few differences are disclosed below.

In this example, the first microphone 604 is selected as the reference microphone. During an initialization phase, the system 602 configures certain filter parameter settings such that the second audio stream 612 and the third audio stream 614 have the same or similar audio characteristics as the first audio stream 610. In the illustrated example, the system 602 includes a reference audio clip selector 616. The reference audio clip selector 616 selects a first audio clip (e.g., a segment, a portion, etc.) from the first audio stream 610 as a reference audio clip. The reference audio clip may be a certain length, such as one second or two seconds. The system 602 includes a reference audio clip updater 618. The reference audio clip updater 618 can determine whether to update the reference audio clip at certain times and/or in response to certain events.

In the illustrated example, the system 602 includes a filter driver 620. The filter driver 620 receives the second audio stream 612. The filter driver 620 applies a realistic style transfer function to the second audio stream 612 so that the second audio stream 612 has the same or similar audio characteristics as the first audio stream 610. In the illustrated example, the filter driver 620 includes a style transfer network 622 and an audio filter 624. The audio filter 624 filters the second audio stream 612 based on one or more parameter settings. The parameter settings can include certain microphone settings such as sampling frequency, dynamic range, gain, bit depth, number of channels, etc. The parameter settings can also include audio filters with effects such as room reverberation, choice of room setup to broadcast in, noise floor of record, sensitivity of microphone, gain of microphone, etc. The parameter settings can also include filter applications, such filter applications in products provided by Intel Corporation, such as Intel® Smart Sound Technology (iSST), Intel® Digital Signal Processor (DSP) hardware, and/or the Intel® Vision Processing Unit (VPU) and Gaussian & Neural Accelerator (GNA) within the system-on-chip (SoC). Therefore, the parameter settings can correspond to audio characteristics including at least one of gain, signal to noise ratio (SNR), noise floor, frequency response, sensitivity, or reverberation. The parameter settings can be adjusted to affect the corresponding audio characteristics. For example, the levels or values of the parameter settings can be adjust to change the sound effect. During an initialization phase, the style transfer network 622 is used to adjust one or more of the parameter settings of the audio filter 624 such that the filtered version of the second audio stream 612 has the same or similar audio characteristics as the first audio stream 610.

During the initialization phase, the style transfer network 622 receives the reference audio clip selected by the reference audio clip selector 616. The style transfer network 408 selects a second audio clip from the second audio stream 612. In some examples, the second audio clip has the same length as the reference audio clip. In some examples, the style transfer network 408 selects the clip from the second audio stream 612 that corresponds to the same time as the reference audio clip. Additionally or alternatively, the style transfer network 622 can select the most recent audio clip from the second audio stream 612 when the initialization phase is started. The style transfer network 622 applies a style transfer function to the second audio clip, based on the reference audio clip, to generate a stylized audio clip 626. The stylized audio clip is stylized version of the second audio clip. The style transfer function identifies audio characteristics of the reference audio clip and applies/transfers the audio characteristics to the second audio clip to generate the stylized audio clip 626. In some examples, the style transfer function is a realistic style transfer function. In some examples, the style transfer function is a machine learning model, such as a Neural Network (NN) style transfer function. An example style transfer function is described in Grinstein, E., Duong, N., Ozerov, A., & Perez, P. (2018). Audio style transfer. CASSP 2018-2018 IEEE International Conference on Acoustics, Speech and Signal Processing (ICASSP).

During the initialization phase, the audio filter 624 receives the second audio clip and filters the second audio clip to generate a filtered audio clip 628. The filtered audio clip 628 is a filtered version of the second audio clip using the current parameter settings of the audio filter 624. In the illustrated example, the system 602 includes a loss function comparator 630. The loss function comparator 630 receives the stylized audio clip 626 and the filtered audio clip 628 and applies a loss function based the stylized audio clip 626 and the filtered audio clip 628. The loss function compares the stylized audio clip 626 and the filtered audio clip 628 and adjusts one or more of the parameter settings of the audio filter 624 based on the difference(s) between the stylized audio clip 626 and the filtered audio clip 628. In some examples, this cycle occurs multiple times. After one or more cycles, the filtered audio clip 628 converges to the stylized audio clip 626 (e.g., sounds the same or substantially the same). After the stylized audio clip 626 and the filtered audio clip 628 converge or substantially converge, the audio filter 624 saves the adjusted parameters settings in a memory 632. These adjust parameters settings represent the settings that produce a style that matches the style of the first microphone 604. Once the parameter settings are determined, the initialization phase if over, and the audio filter 624 filters the second audio stream 612 using the adjust parameter settings to generate a filtered version of the second audio stream 612.

In the illustrated example, the system 602 includes a filter driver 634 for the third audio stream 614. The filter driver 634 operates the same as the filter driver 620 disclosed in connection with the second audio stream 612. In particular, the filter driver 634 includes a style transfer network 636 and an audio filter 638 that filters the third audio stream 614. The style transfer network 636 is used to adjust parameter settings of the audio filter 638 so that the third audio stream 614 has the same or similar style as the first audio stream 610. To avoid redundancy, a description of the filter driver 634 is not provided. Instead, it is understood that any of the example aspects disclosed in connection with the filter driver 620 associated with the second audio stream 612 can likewise apply to the filter driver 634 associated with the third audio stream 614. The example system 602 can include filter drivers for any additional microphones that may be added to the system 602.

The first audio stream 610 and the filter versions of the second and third audio streams 612, 614 can be output to the video application 118. The audio streams 610-614 can be broadcast to one or more viewers.

In this example, the first microphone 604 is used as the reference microphone. However, in other examples, the second microphone 606 or the third microphone 608 can be the reference microphone. In such an example, a filter driver can be provided for the first audio stream 610. In some examples, the system 602 can switch the reference microphone during the live streaming session. In some examples, the switching is based on user input. For example, the person 102 can select which microphone to use as the reference microphone.

In other examples, instead of using one of the microphones 604-608 as the reference microphone for the other microphones, a style from an outside source can be applied to all of the microphones 604-608. For example, the style from a microphone in an entirely different environment (e.g., a room with glass walls, a theater effect, a wind tunnel, outdoors, etc.) can be applied to the microphones 604-608. This enables all of the microphones to match a style desired style, such as a style from a studio quality microphone.

In the examples disclosed above a realistic style transfer function is used. Realistic style transfer functions have tighter controls and produce results of the same look and feel for cameras and microphones. As an alternative, the example systems 120, 602 can utilize artistic style transfer functions that can be applied to the cameras and/or microphones. Artistic style transfer functions may have much wider adjustment control and more stylization that can be achieved by using an input image/audio stream with a style that is not typical of off-the-shelf cameras and microphones, and could be any image or audio clip.

While an example manner of implementing the example multi-camera style transfer system 120 of FIG. 1 is illustrated in FIG. 4, one or more of the elements, processes, and/or devices illustrated in FIG. 4 may be combined, divided, re-arranged, omitted, eliminated, and/or implemented in any other way. Further, the example reference image selector 400, the example reference image updater 404, the example filter driver 406, the example style transfer network 408, the example video filter 410, the example encoder 416, the example adaptive instance normalizer 418, the example decoder 420, the example loss function comparator 424, the example filter driver 428, the example style transfer network 430, the example video filter 432, the example segmenter 434, and/or, more generally, the example multi-camera style transfer system 120 of FIG. 1, may be implemented by hardware alone or by hardware in combination with software and/or firmware. Thus, for example, any of the example reference image selector 400, the example reference image updater 404, the example filter driver 406, the example style transfer network 408, the example video filter 410, the example encoder 416, the example adaptive instance normalizer 418, the example decoder 420, the example loss function comparator 424, the example filter driver 428, the example style transfer network 430, the example video filter 432, the example segmenter 434, and/or, more generally, the example multi-camera style transfer system 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example multi-camera style transfer system 120 of FIG. 1 may include one or more elements, processes, and/or devices in addition to, or instead of, those illustrated in FIG. 4, and/or may include more than one of any or all of the illustrated elements, processes and devices.

While an example manner of implementing the example multi-microphone style transfer system 602 is illustrated in FIG. 6, one or more of the elements, processes, and/or devices illustrated in FIG. 6 may be combined, divided, re-arranged, omitted, eliminated, and/or implemented in any other way. Further, the example reference audio clip selector 616, the example reference audio clip updater 618, the example filter driver 620, the example style transfer network 622, the example audio filter 624, the example loss function comparator 630, the example filter driver 634, the example style transfer network 636, the example video filter 638, and/or, more generally, the example multi-microphone style transfer system 602 of FIG. 6, may be implemented by hardware alone or by hardware in combination with software and/or firmware. Thus, for example, any of the example reference audio clip selector 616, the example reference audio clip updater 618, the example filter driver 620, the example style transfer network 622, the example audio filter 624, the example loss function comparator 630, the example filter driver 634, the example style transfer network 636, the example video filter 638, and/or, more generally, the example multi-microphone style transfer system 602, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example multi-microphone style transfer system 602 of FIG. 6 may include one or more elements, processes, and/or devices in addition to, or instead of, those illustrated in FIG.

6, and/or may include more than one of any or all of the illustrated elements, processes and devices.

Figure 7:
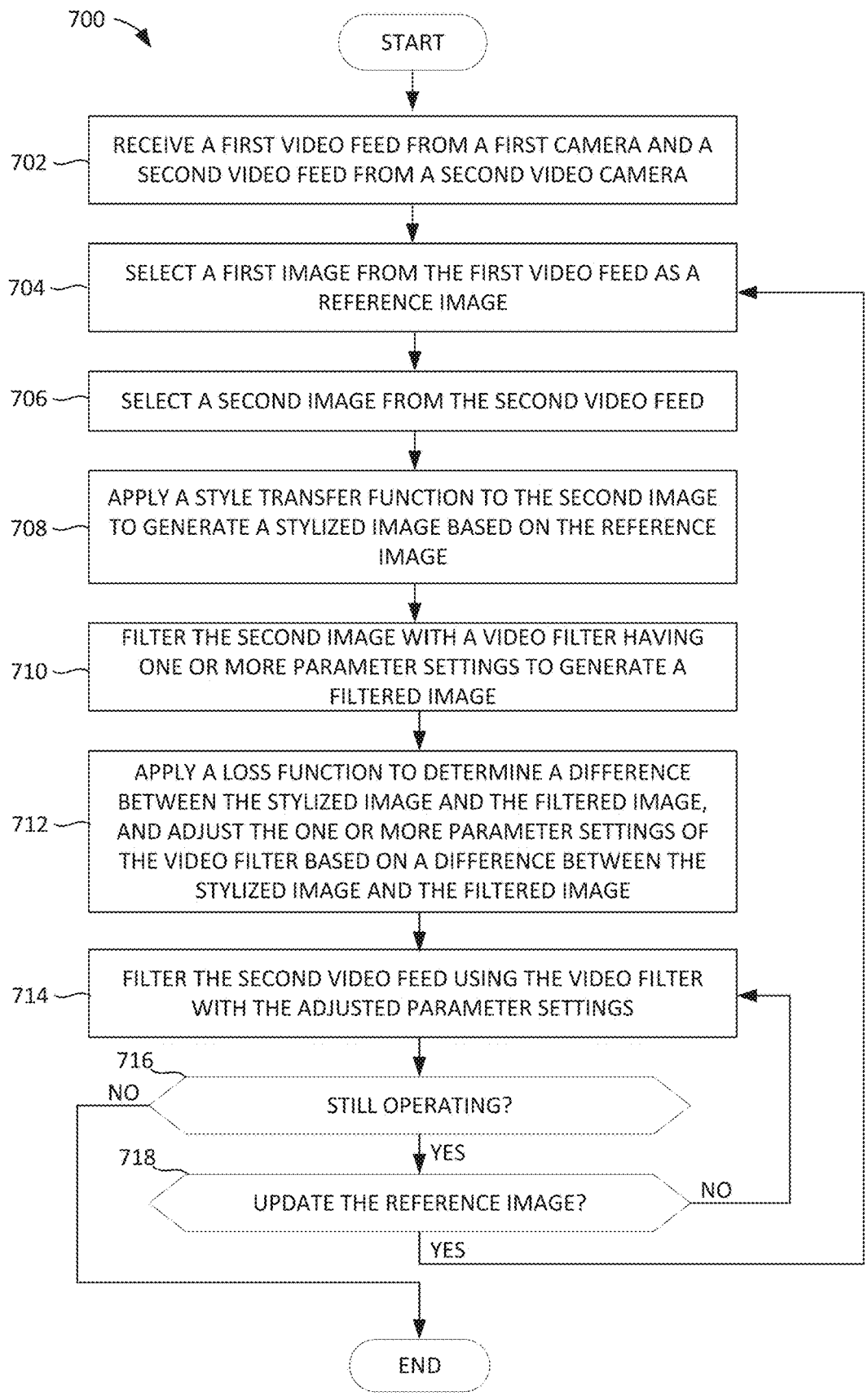
FIG. 7 is a flowchart representative of example machine-readable instructions and/or example operations that may be executed by example processor circuitry to implement the example multi-camera style transfer system of FIG. 4.
Figure 8:
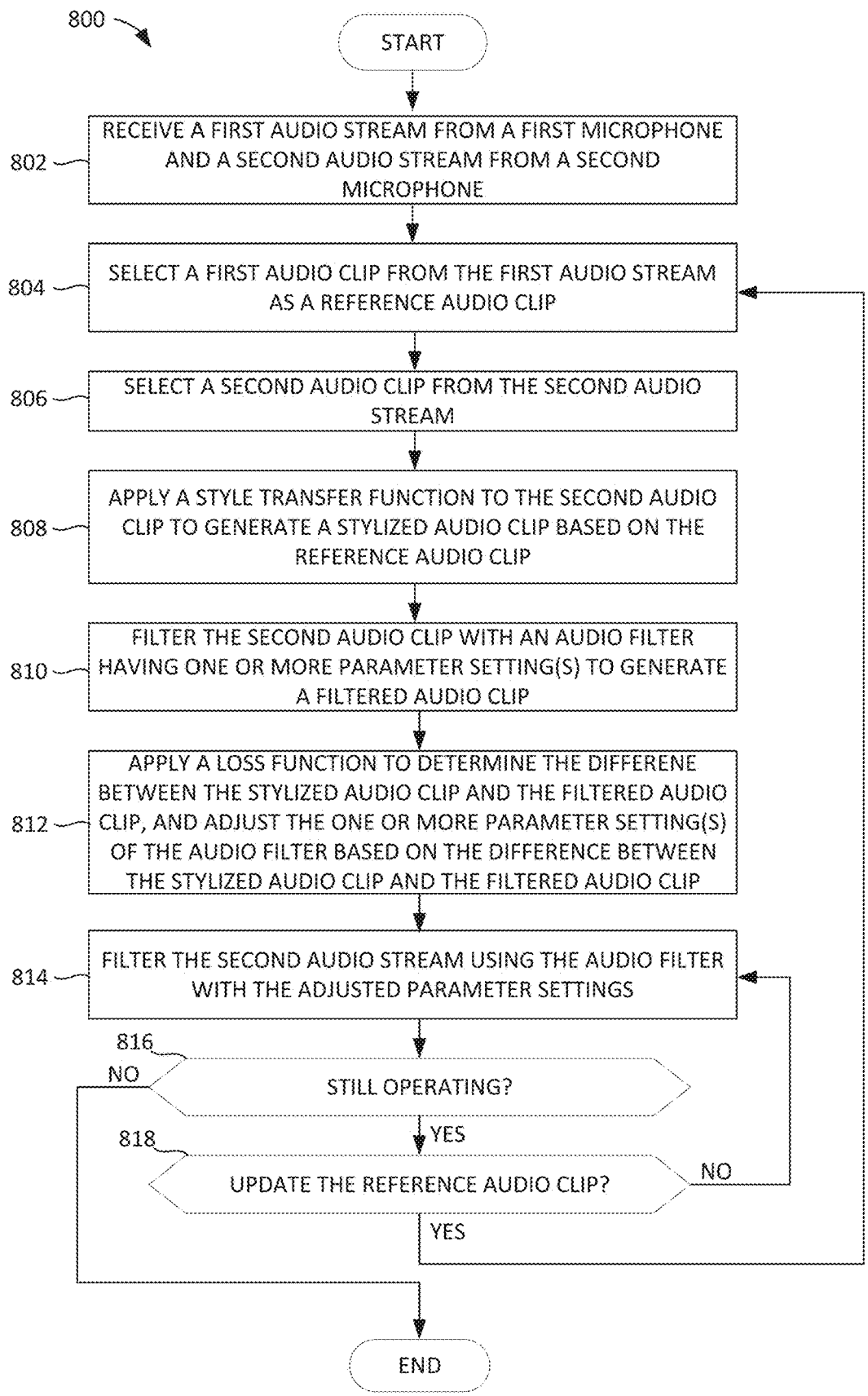
FIG. 8 is a flowchart representative of example machine-readable instructions and/or example operations that may be executed by example processor circuitry to implement the example multi-microphone style transfer system of FIG. 6.

A flowchart representative of example hardware logic circuitry, machine-readable instructions, hardware implemented state machines, and/or any combination thereof for implementing the example multi-camera style transfer system 120 of FIGS. 1 and 4 is shown in FIG. 7. A flowchart representative of example hardware logic circuitry, machine-readable instructions, hardware implemented state machines, and/or any combination thereof for implementing the example multi-microphone style transfer system 602 of FIG. 6 is shown in FIG. 8. The machine-readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7 and 8, many other methods of implementing the example multi-camera style transfer system 120 and/or the example multi-microphone style transfer system 602 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7 and 8 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine-readable instructions and/or example operations 700 that may be executed and/or instantiated by processor circuitry to adjust one or more visual characteristic(s) of a video feed to match or substantially match the visual characteristic(s) of another video feed. The machine-readable instructions and/or the operations 700 are described in connection with the first camera 112, as the reference camera, and the second camera 114. However, it is understood that the example machine-readable instructions and/or the example operations 700 can be is similarly implemented in connection with the first camera 112 and the third camera 116 and/or any additional cameras in a multi-camera system.

The machine-readable instructions and/or the operations 700 of FIG. 7 begin at block 702, at which the system 120 receives the first video feed 202 from the first camera 112 and the second video feed 204 from the second camera 114. The first and second cameras 112, 114 may be recording the same scene from different positions or angles, such as during a live streaming session.

Blocks 704-712 may be considered an initialization or adjustment phase. The initialization phase is used to adjust or configure the filter driver 406. The initialization phase may begin when the system 120 is first activated and/or the second camera 112 is activated. At block 704, the reference image selector 400 selects the first image 402 from the first video feed 202 as the reference image. In some examples, the reference image selector 400 selects the most recent image from the first video feed 202 as the reference image when the initialization phase starts. In other examples, the reference image selector 400 can use other criteria to select an image from the first video feed 202 as the reference image.

At block 706, the filter driver 406 selects an image from the second video feed 204 to be used in the style transfer operation. For example, the filter driver 406 can select the second image 412 from the second video feed 204. In some examples, the filter driver 406 selects the first image from the second video feed 204 when the second camera 114 is activated. In other examples, the filter driver 406 can use other criteria to select an image from the second video feed 204.

At block 708, the style transfer network 408 applies the style transfer function to the second image 412 to generate the stylized image 414 based on the reference image. Therefore, in some examples, the style transfer network 408 implements means for applying a style transfer function to a second image from a second video feed to generate a stylized image based on a reference image. In this example, the reference image corresponds to the first image 402 from the first camera 112. As disclosed above, in some examples, the style transfer function is a machine learning model, such as a Neural Network (NN) style transfer function.

The loss function comparator 424 adjusts one or more parameter settings of the video filter 410 based on the stylized image 414. For example, at block 710, the video filter 410 filters the second image 412 using one or more parameter settings to generate the filtered image 422. At block 712, the loss function comparator 424 applies a loss function to determine a different between (e.g., compare) the stylized image 414 and the filtered image 422, and adjust the one or more parameter settings of the video filter 410 based on the difference between the stylized image 414 and the filtered image 422. Therefore, the loss function comparator 424 implements means for adjusting one or more parameter settings of a video filter (filter means) based on a stylized image. The parameter settings correspond to the visual characteristics including at least one of color temperature, tone, exposure, white balance, hue, saturation, or brightness. The loss function may adjust the parameter settings multiple times until the filter image 422 matches or substantially matches (e.g., based on a threshold or tolerance of the loss function) the stylized image 414. Once the filtered image 422 matches or substantially matches the stylized image 414, the filter driver 406 saves the adjusted parameter settings are stored in the memory 426. After block 712, the initialization phase is over.

At block 714, the filter driver 406 filters the second video feed 204 using the video filter 410 with the adjusted parameter settings. Therefore, the video filter 410 implements means for filing the second video feed 204. The adjusted parameter settings generate or produced a filtered version of the second video feed 204 from the second camera 114 that has visual characteristics matching or substantially matching the first video feed 202 from the first camera 112. As such, when switching between the camera feeds, there is a consistent look and feel between the camera feeds. This reduces or eliminates any color differences that would otherwise be distracting or jarring for a viewer.

At block 716, the system 120 determines whether the cameras 112, 114 are still operating. For example, if the live streaming session has ended, the cameras 112, 114 may be deactivated. If the cameras 112, 114 are not operating, the machine-readable instructions and/or the operations 700 ends. However, if the cameras 112, 114 are still operating, such as if the live streaming session is still occurring, control proceeds to block 714 and the video filter 410 continues to filter the second video feed 204 using the adjusted parameter settings.

At block 718, the reference image updater 404 determines whether to update the reference image. Therefore, the reference image updater 404 implements means for determining whether to update a reference image. In some examples, the reference image updated 404 determines whether to update the reference image by comparing a parameter to a threshold. In some examples, the parameter includes at least one of a time limit, a difference between a current image from the first video feed 202 and the reference image, or a scene change in the first video feed 202. If the reference image updater 404 determines the reference image is to be updated (e.g., the parameter meets or exceeded the threshold), control proceed backs to block 704 and the reference image updater 404 instructs the reference image selector 400 to select a new image from the first video feed 202 as the reference image. The example initialization phase of blocks 704-712 is then repeated again. For example, the reference image selector 400 selects a third image from the first video feed 202 as the reference image, the filter driver 406 selects a fourth image from the second video feed 204, the style transfer network 408 applies the style transfer function to the fourth image to generate a stylized image based on the reference image, the loss function comparator 424 adjusts the parameter settings of the video filter 410 based on the stylized image, and the filter driver 406 applies the video filter 410 with the adjusted settings to the second video feed 204. Updating the reference image ensures the visual characteristics of the camera feeds remain consistent over time. If the reference image updater 404 determines the reference image is not to be updated (e.g., the parameter does not meet or exceed the threshold), control proceeds to block 714 and the video filter 410 continues to filter the second video feed 204 using the current filter settings.

In some examples, certain styles can be applied to specific regions or segments in the video feed. For example, the segmenter 434 can identify the first segment 500 in the reference image and identify the second segment 502 in the second image 412. The style transfer network 408 applies the style transfer function to the second segment 502 in the second image 412 to generate the stylized image 414. The loss function comparator 424 adjusts one or more of the parameter settings of the video filter 410 based on the stylized image 414. Thereafter, the segmenter 434 identifies the corresponding segment (e.g., the object) in the second video feed 204 and the filter driver 406 filters the corresponding segment in the second video feed 204 using the video filter 410 with the adjusted parameter settings.

FIG. 8 is a flowchart representative of example machine-readable instructions and/or example operations 800 that may be executed and/or instantiated by processor circuitry to adjust one or more audio characteristic(s) of an audio stream to match or substantially match the audio characteristic(s) of another audio stream. The machine-readable instructions and/or the operations 800 are described in connection with the first microphone 604, as the reference microphone, and the second microphone 606. However, it is understood that the example machine-readable instructions and/or the example operations 800 can be is similarly implemented in connection with the first microphone 604 and the third microphone 608 and/or any additional microphones in a multi-microphone system.

The machine-readable instructions and/or the operations 800 of FIG. 8 begin at block 802, at which the system 602 receives the first audio stream 610 from the first microphone 604 and the second audio stream 612 from the second microphone 606. The first and second microphones 604, 606 may be recording the same audio from different locations, such as during a live streaming session.

Blocks 804-812 may be considered an initialization or adjustment phase. The initialization phase is used to adjust or configure the filter driver 620. The initialization phase may be implemented when the system 602 is first started and/or the second microphone 606 is activated. At block 804, the reference audio clip selector 616 selects a first audio clip from the first audio stream 610 as the reference audio clip. In some examples, the reference audio clip selector 616 selects the most recent audio clip from the first audio stream 610 as the reference audio clip when the initialization phase starts. In some examples, the reference audio clip has a defined length, such as one second or two seconds.

At block 806, the filter driver 620 selects an audio clip, referred to as a second audio clip, from the second audio stream 612 to be used in the style transfer operation. In some examples, the filter driver 620 selects the audio clip from the second audio stream 612 that corresponds to the same time and duration as the reference audio clip from the first audio stream 610. In other examples, the filter driver 620 can select an audio clip from the second audio stream 612 from a different time and/or having a different duration as the reference audio clip.

At block 808, the style transfer network 622 applies the style transfer function to the second audio clip to generate the stylized audio clip 626 based on the reference audio clip. As disclosed above, in some examples, the style transfer function is a machine learning model, such as a Neural Network (NN) audio style transfer function.

The loss function comparator 630 adjusts one or more parameter settings of the audio filter 624 based on the stylized audio clip 626. For example, at block 810, the audio filter 624 filters the second audio clip using one or more parameter settings to generate the filtered audio clip 628. At block 812, the loss function comparator 630 applies a loss function to compare the stylized audio clip 626 and the filtered audio clip 628, and adjust the parameter setting(s) of the audio filter 624 based on a difference between the stylized audio clip 626 and the filtered audio clip 628. The loss function may adjust the parameter setting(s) multiple times until the filtered audio clip 628 matches or substantially matches (e.g., based on a threshold or tolerance of the loss function) the stylized audio clip 626. Once the filtered audio clip 628 matches or substantially matches the stylized image 414, the filter driver 620 saves the adjusted parameter setting(s) in the memory 632. After block 812, the initialization phase ends.

At block 814, the filter driver 620 filters the second audio stream 612 using the audio filter 624 with the adjusted parameter settings. These parameter settings produce a filtered version of the second audio stream 612 from the second microphone 606 that has audio characteristics matching or substantially matching the first audio stream 610 from the first microphone 604. Therefore, when switching between microphones, there is a consistent sound between the microphone streams.

At block 816, the system 602 determines whether the microphones 640, 606 are still operating. If the microphones 604, 606 are not operating, the machine-readable instructions and/or the operations 800 ends. However, if the microphones 604, 606 are still operating, control proceeds to block 814 and the filter driver 620 continues to filter the second audio stream 612 using the audio filter 624 with the adjusted parameter settings.

At block 818, the reference audio clip updater 618 determines whether to update the reference audio clip. In some examples, the reference audio clip updater 618 determines whether to update the reference audio clip by comparing a parameter (e.g., time, load, scene change, etc.) to a threshold. If the reference audio clip updater 618 determines the reference audio clip is to be updated (e.g., the parameter meets or exceeded the threshold), control proceed backs to block 804 and the reference audio clip updater 618 instructs the reference audio clip selector 616 to select a new audio from the first audio stream 610 as the reference image. The example initialization phase of blocks 804-812 is then repeated again. Updating the reference audio clip ensures the audio characteristics of the microphone audio streams remain consistent over time. If the reference audio clip updater 618 determines the reference audio clip is not to be updated (e.g., the parameter does not meet or exceed the threshold), control proceeds to block 814 and the audio filter 624 continues to filter the second audio stream 612 using the current parameter settings.

Therefore, the example systems and methods disclosed herein advantageously adjust certain video feeds or audio feeds to produce similar characteristics across all the sensors. This enables users to produce high quality content even while using less expensive, off-the-shelf cameras and microphones. In some examples, the systems and methods may be used to adjust the filters in real-time or substantially real-time. This enables live streamers and other users to benefit from the calibration techniques instantaneously while the content is being recorded. However, the examples disclosed herein can also be applied to pre-recorded content, such as during post-production. As an example, a collage of crowd-sourced videos from multiple individual sources can be combined and put together into a single video montage.

Figure 9:
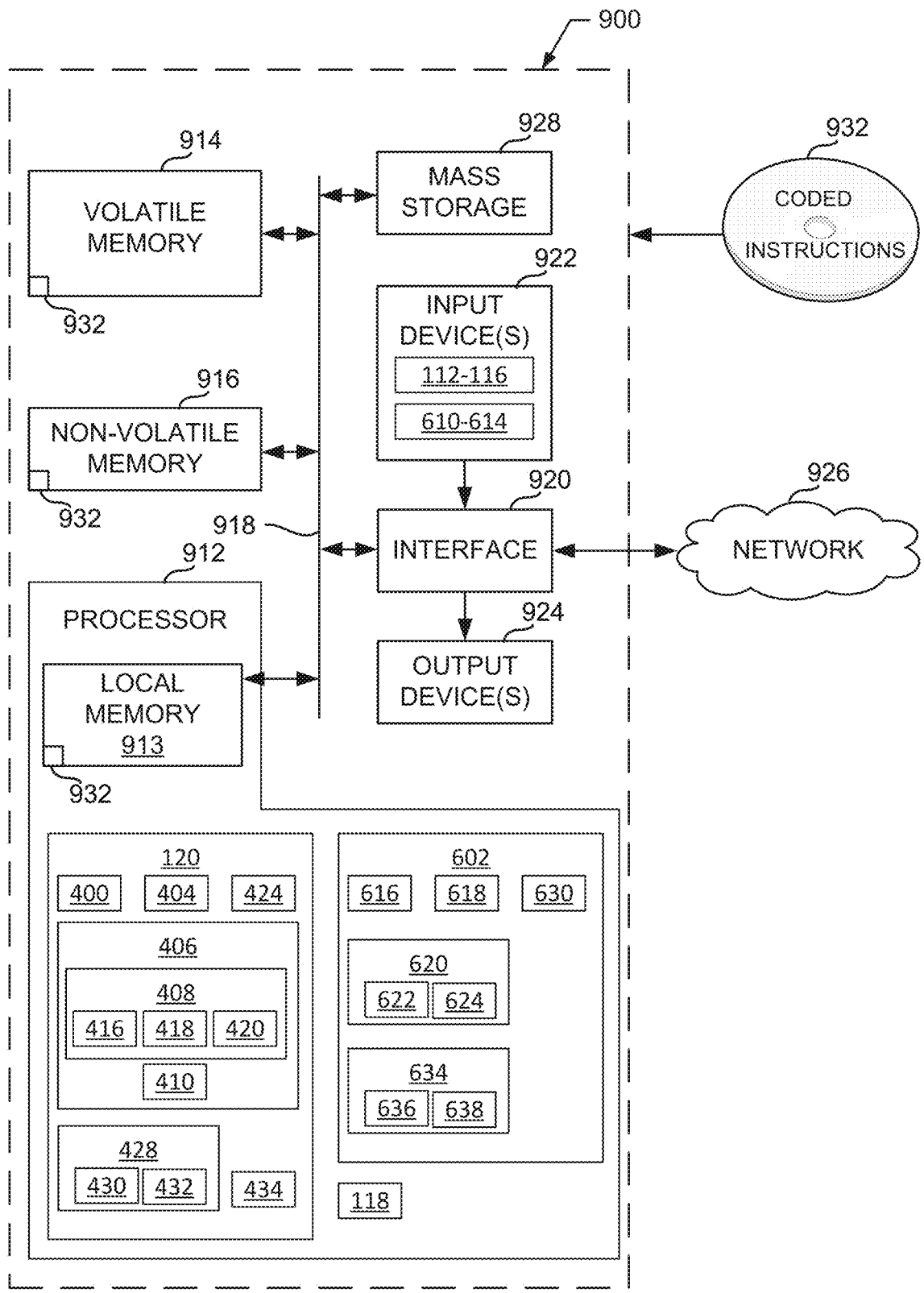
FIG. 9 is a block diagram of an example processing platform including processor circuitry structured to execute the example machine-readable instructions and/or the example operations of FIGS. 7 and/or 8 to implement the example multi-camera style transfer system of FIG. 4 and/or example multi-microphone style transfer system of FIG. 6.

FIG. 9 is a block diagram of an example processor platform 900 structured to execute and/or instantiate the machine-readable instructions and/or the operations of FIGS. 7 and 8 to implement the multi-camera style transfer system 120 of FIG. 4 and/or the example multi-microphone style transfer system 602 of FIG. 6. While in this example the processor platform 900 implements both the multi-camera style transfer system 120 and the example multi-microphone style transfer system 602, in other examples, the processor platform 900 may be structured to implement only one of the multi-camera style transfer system 120 or the example multi-microphone style transfer system 602. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the multi-camera style transfer system 120 including the reference image selector 400, the example reference image updater 404, the example filter driver 406, the example style transfer network 408, the example video filter 410, the example encoder 416, the example adaptive instance normalizer 418, the example decoder 420, the example loss function comparator 424, the example filter driver 428, the example style transfer network 430, the example video filter 432, and the example segmenter 434. In this example, the processor circuitry 912 also implements the multi-microphone style transfer system 602 including the example reference audio clip selector 616, the example reference audio clip updater 618, the example filter driver 620, the example style transfer network 622, the example audio filter 624, the example loss function comparator 630, the example filter driver 634, the example style transfer network 636, and the example video filter 638. Further, in this example, the processor circuitry 912 implements the example video application 118.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by the cameras 112-116 and/or the microphones 604-608. Additionally or alternatively, the input device(s) 922 can be implemented by, for example, an audio sensor, a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED) such as the display 108, an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. The memory 426 and/or the memory 632 can be implemented by the volatile memory 914, the non-volatile memory 916, and/or the mass storage devices 928.

The machine executable instructions 932, which may be implemented by the machine-readable instructions of FIGS. 7 and 8, may be stored in the mass storage device 928, in the volatile memory 914, in the non-volatile memory 916, and/or on a removable non-transitory computer readable storage medium such as a CD or DVD.

Figure 10:
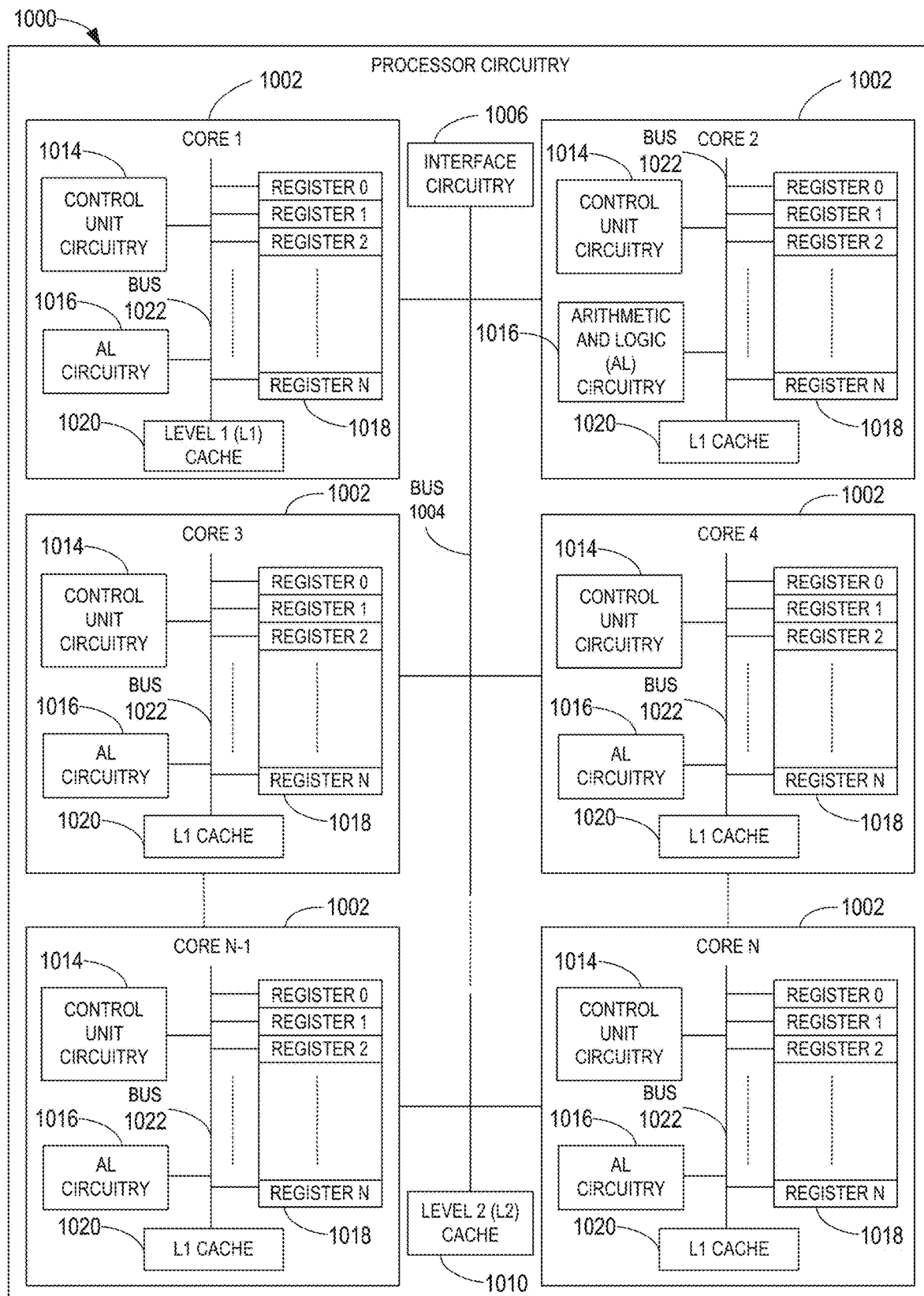
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a general purpose microprocessor 1000. The general purpose microprocessor circuitry 1000 executes some or all of the machine-readable instructions of the flowcharts of FIGS. 7 and/or 8 to effectively instantiate the circuitry of FIGS. 4 and 6 as logic circuits to perform the operations corresponding to those machine-readable instructions. In some such examples, the circuitry of FIGS. 4 and/or 6 is instantiated by the hardware circuits of the microprocessor 1000 in combination with the instructions. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine-readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine-readable instructions and/or operations represented by the flowcharts of FIGS. 7 and 8.

The cores 1002 may communicate by a first example bus 1004. In some examples, the first bus 1004 may implement a communication bus to effectuate communication associated with one(s) of the cores 1002. For example, the first bus 1004 may implement at least one of an Inter-Integrated Circuit (I2C) bus, a Serial Peripheral Interface (SPI) bus, a PCI bus, or a PCIe bus. Additionally or alternatively, the first bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
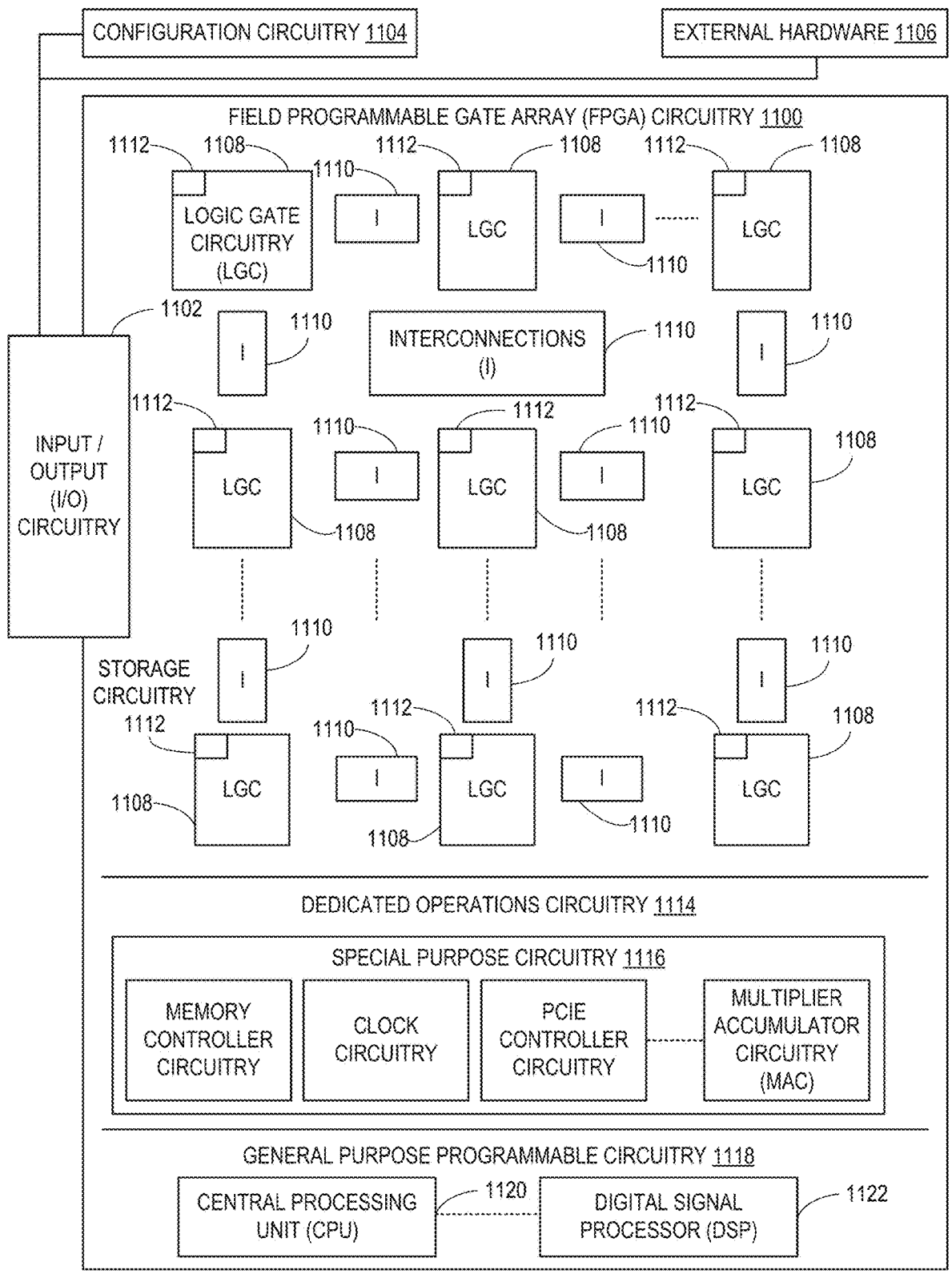
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine-readable instructions. However, once configured, the FPGA circuitry 1100 instantiates the machine-readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine-readable instructions represented by the flowcharts of FIGS. 7 and 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine-readable instructions represented by the flowcharts of FIGS. 7 and 8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 7 and 8. As such, the FPGA circuitry 1100 may be structured to effectively instantiate some or all of the machine-readable instructions of the flowcharts of FIGS. 7 and 8 as dedicated logic circuits to perform the operations corresponding to those software instructions in a dedicated manner analogous to an ASIC. Therefore, the FPGA circuitry 1100 may perform the operations corresponding to the some or all of the machine-readable instructions of FIGS. 7 and 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine-readable instructions to configure the FPGA circuitry 1100, or portion(s) thereof. In some such examples, the configuration circuitry 1104 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine-readable instructions of FIGS. 7 and 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an onboard CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine-readable instructions represented by the flowcharts of FIGS. 7 and 8 may be executed by one or more of the cores 1002 of FIG. 10, a second portion of the machine-readable instructions represented by the flowcharts of FIGS. 7 and 8 may be executed by the FPGA circuitry 1100 of FIG. 11, and/or a third portion of the machine-readable instructions represented by the flowcharts of FIGS. 7 and 8 may be executed by an ASIC. It should be understood that some or all of the circuitry of FIGS. 4 and 6 may, thus, be instantiated at the same or different times. Some or all of the circuitry may be instantiated, for example, in one or more threads executing concurrently and/or in series. Moreover, in some examples, some or all of the circuitry of FIGS. 4 and 6 may be implemented within one or more virtual machines and/or containers executing on the microprocessor.

In some examples, the processor circuitry 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that intelligently configure camera and microphone outputs to have consistent output characteristics. As such, when switching between different cameras or microphones, there is a consistent look or sound from the audio/video feeds. This enables users with less expensive, off-the-shelf sensors to create high quality content that is only otherwise only achievable via expensive and time-consuming professional setups.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A multi-camera style transfer system comprising:
 at least one memory;
 instructions in the system; and
 at least one processor circuit to be programmed by the instructions to at least:
  access a first live video feed from a first camera and a second live video feed from a second camera, the first and second live video feeds of a same scene from different positions;
  apply a style transfer function to a second image from the second live video feed to generate a stylized image based on a reference image, the reference image corresponding to a first image from the first live video feed;
  adjust one or more parameter settings of a video filter based on the stylized image; and
  filter the second live video feed via the video filter with the adjusted parameter settings to generate a filtered version of the second live video feed.

2. The multi-camera style transfer system of claim 1, wherein the style transfer function is a photorealistic style transfer function.

3. The multi-camera style transfer system of claim 1, wherein the style transfer function is applied by a machine learning model.

4. The multi-camera style transfer system of claim 3, wherein the style transfer function is a Neural Network (NN) style transfer function.

5. The multi-camera style transfer system of claim 1, wherein the parameter settings correspond to visual characteristics including at least one of color temperature, tone, exposure, white balance, hue, saturation, or brightness.

6. The multi-camera style transfer system of claim 1, wherein one or more of the at least one processor circuit is to adjust the one or more parameter settings of the video filter by:
 filtering the second image with the video filter with first parameter settings to generate a filtered image; and
 applying a loss function to:
  determine a difference between the stylized image and the filtered image; and
  change the first parameter settings to second parameter settings based on the difference between the stylized image and the filtered image.

7. The multi-camera style transfer system of claim 1, wherein one or more of the at least one processor circuit is to determine whether to update the reference image.

8. The multi-camera style transfer system of claim 7, wherein one or more of the at least one processor circuit is to determine whether to update the reference image based on a comparison of a parameter to a threshold.

9. The multi-camera style transfer system of claim 8, wherein the parameter includes at least one of a time limit, a difference between a current image from the first live video feed and the reference image, or a scene change in the first live video feed.

10. The multi-camera style transfer system of claim 1, wherein one or more of the at least one processor circuit is to:
 identify a first segment in the reference image;
 identify a second segment in the second image;
 apply the style transfer function to the second segment in the second image to generate the stylized image;
 adjust the one or more parameter settings of the video filter based on the stylized image; and
 filter a corresponding segment in the second live video feed using the video filter with the adjusted parameter settings.

11. A non-transitory computer readable storage medium comprising instructions to cause at least one processor to at least:
 access a first live video feed from a first camera and a second live video feed from a second camera, the first and second cameras live video feeds of a same scene from different positions;
 apply a style transfer function to a second image from the second live video feed to generate a stylized image based on a reference image, the reference image corresponding to a first image from the first live video feed;
 adjust one or more parameter settings of a video filter based on the stylized image; and filter the second live video feed via the video filter with the adjusted parameter settings to generate a filtered version of the second live video feed.

12. The non-transitory computer readable storage medium of claim 11, wherein the style transfer function is a photorealistic style transfer function.

13. The non-transitory computer readable storage medium of claim 11, wherein the style transfer function is applied by a machine learning model.

14. The non-transitory computer readable storage medium of claim 13, wherein the style transfer function is a Neural Network (NN) style transfer function.

15. The non-transitory computer readable storage medium of claim 11, wherein the parameter settings correspond to visual characteristics including at least one of color temperature, tone, exposure, white balance, hue, saturation, or brightness.

16. The non-transitory computer readable storage medium of claim 11, wherein the instructions are to cause the at least one processor to adjust the one or more parameter settings of the video filter by:
　filtering the second image of the video filter with first parameter settings to generate a filtered image; and
　applying a loss function to:
　　determine a difference between the stylized image and the filtered image; and
　　change the first parameter settings to second parameter settings based on the difference between the stylized image and the filtered image.

17. The non-transitory computer readable storage medium of claim 11, wherein the instructions are to cause the at least one processor to determine whether to update the reference image.

18. The non-transitory computer readable storage medium of claim 17, wherein the instructions are to cause the at least one processor to determine whether to update the reference image based on a comparison of a parameter to a threshold.

19. The non-transitory computer readable storage medium of claim 18, wherein the parameter includes at least one of a time limit, a difference between a current image from the first live video feed and the reference image, or a scene change in the first live video feed.

20. The non-transitory computer readable storage medium of claim 11, wherein the instructions are to cause the at least one processor to:
　identify a first segment in the reference image;
　identify a second segment in the second image;
　apply the style transfer function to the second segment in the second image to generate the stylized image;
　adjust the one or more parameter settings of the video filter based on the stylized image; and
　filter a corresponding segment in the second live video feed using the video filter with the adjusted parameter settings.

\* \* \* \* \*